US012431153B2

(12) United States Patent
Cui

(10) Patent No.: US 12,431,153 B2
(45) Date of Patent: Sep. 30, 2025

(54) SPEECH PROCESSING METHOD AND APPARATUS AND APPARATUS FOR SPEECH PROCESSING

(71) Applicant: BEIJING SOGOU TECHNOLOGY DEVELOPMENT CO., LTD., Beijing (CN)

(72) Inventor: Guohui Cui, Beijing (CN)

(73) Assignee: Beijing Sogou Technology Development Co., Ltd., Beijing (CN)

( * ) Notice: Subject to any disclaimer, the term of this patent is extended or adjusted under 35 U.S.C. 154(b) by 243 days.

(21) Appl. No.: 18/116,768

(22) Filed: Mar. 2, 2023

(65) Prior Publication Data

US 2023/0206937 A1 Jun. 29, 2023

Related U.S. Application Data

(63) Continuation of application No. PCT/CN2021/102566, filed on Jun. 25, 2021.

(51) Int. Cl.
*G10L 21/0216* (2013.01)
*G10L 15/20* (2006.01)
*G10L 25/78* (2013.01)

(52) U.S. Cl.
CPC .......... *G10L 21/0216* (2013.01); *G10L 25/78* (2013.01); *G10L 2021/02165* (2013.01)

(58) Field of Classification Search
CPC ................. G10L 21/0216; G10L 25/78; G10L 2021/02165; G10L 21/0272;
(Continued)

(56) References Cited

U.S. PATENT DOCUMENTS

2005/0080616 A1 4/2005 Leung et al.
2007/0021958 A1* 1/2007 Visser .................... G10L 25/78 704/226
(Continued)

FOREIGN PATENT DOCUMENTS

CN 102592607 A 7/2012
CN 104810024 A 7/2015
(Continued)

OTHER PUBLICATIONS

Israel Cohen, "Analysis of Two-Channel Generalized Sidelobe Canceller (GSC) With Post-Filtering," IEEE Transactions on Speech and Audio Processing, vol. 11, No. 6, Nov. 2003 (Year: 2003).*
(Continued)

*Primary Examiner* — Paras D Shah
*Assistant Examiner* — Mulugeta Tuji Dugda
(74) *Attorney, Agent, or Firm* — Morgan, Lewis & Bockius LLP

(57) ABSTRACT

An embodiment of this application provides a speech processing method and apparatus, and an apparatus for speech processing, applied to a terminal device, where the terminal device is equipped with at least two microphones. The method includes: performing summation on signals received by the at least two microphones to obtain a first signal, and performing subtraction on the signals received by the at least two microphones to obtain a second signal; performing blind separation on the first signal and the second signal to obtain a speech signal and a noise signal; and performing adaptive noise cancellation on the speech signal based on the noise signal to obtain a target speech signal. The embodiments of this application can optimize a speech denoising effect, and further improve the speech recognition accuracy of the terminal device in a complex and changeable environment with large noise or strong interference.

15 Claims, 6 Drawing Sheets

(58) Field of Classification Search
CPC ....... G10L 2021/02166; G10L 21/0208; G10L 15/20; G10L 2021/02161
See application file for complete search history.

(56) References Cited

U.S. PATENT DOCUMENTS

| | | | | |
|---|---|---|---|---|
| 2009/0164212 A1* | 6/2009 | Chan | G10L 21/0208 | 704/226 |
| 2009/0190774 A1* | 7/2009 | Wang | G10L 21/028 | 381/92 |
| 2010/0046770 A1* | 2/2010 | Chan | H04R 3/005 | 381/94.1 |
| 2019/0028803 A1* | 1/2019 | Benattar | H04S 7/304 | |

FOREIGN PATENT DOCUMENTS

| | | | | | |
|---|---|---|---|---|---|
| CN | 106504763 | A | | 3/2017 | |
| CN | 110085247 | A | | 8/2019 | |
| DE | 102012217522 | A1 | * | 3/2014 | G01S 3/86 |
| WO | WO-2016168356 | A1 | * | 10/2016 | G10L 19/20 |

OTHER PUBLICATIONS

S. Woo, S. Lee and H. Jeong, "Combined Architecture of Adaptive Beamforming and Blind Source Separation for Speech Recognition of Intelligent Service Robots," The 2007 International Conference on Intelligent Pervasive Computing (IPC 2007), Jeju, Korea (South), 2007, pp. 214-219 (Year: 2007).*
Zhou, Lihong. "Blind source separation systems for hearing aids." PhD diss., University of Ottawa (Canada), 2010. (Year: 2010).*
Tencent Technology, ISR, PCT/CN2021/102566, Dec. 7, 2021, 2 pgs.
Tencent Technology, WO, PCT/CN2021/102566, Dec. 7, 2021, 3 pgs.
Tencent Technology, IPRP, PCT/CN2021/102566, Sep. 12, 2023, 4 pgs.
Tencent Technology, Extended European Search Report, EP Patent Application No. 21932436.5, Jun. 26, 2024, 11 pgs.
Israel Cohen, "Analysis of Two-Channel Generalized Sidelobe Canceller (GSC) with Post-Filtering", IEEE Transactions on Speech and Audio Processing, vol. 11, No. 6, DOI: 10.1109/TSA.2003.818105, Nov. 2003, 16 pgs.

* cited by examiner

SPEECH PROCESSING METHOD AND APPARATUS AND APPARATUS FOR SPEECH PROCESSING

CROSS-REFERENCE TO RELATED APPLICATION

This application is a continuation application of PCT Patent Application No. PCT/CN2021/102566, entitled "SPEECH PROCESSING METHOD AND APPARATUS AND APPARATUS FOR SPEECH PROCESSING" filed on Jun. 25, 2021, which claims priority to Chinese Patent Application No. 202110303349.2, filed with the China National Intellectual Property Administration on Mar. 22, 2021 and entitled "SPEECH PROCESSING METHOD AND APPARATUS AND APPARATUS FOR SPEECH PROCESSING", all of which are incorporated herein by reference in their entirety.

FIELD OF THE TECHNOLOGY

This application relates to the field of intelligent control technologies, and in particular, to a speech processing method and apparatus, and an apparatus for speech processing.

BACKGROUND OF THE DISCLOSURE

As speech recognition technologies become increasingly mature, more and more intelligent devices appear in the market, such as smart speakers or smart TVs. These intelligent devices provide a user with more convenient interactive manners based on the speech recognition technologies.

The intelligent device may convert voice of the user into text through the speech recognition technologies, and then analyze the text to understand instructions transmitted by the user. Generally, in a quiet or high signal-to-noise ratio environment, the intelligent device may accurately recognize speech of the user. However, in an actual application, the environment in which the user is located is complex and changeable, and noise or interference often affects accuracy of speech recognition performed by the intelligent device. As a result, speech recognition performed by the intelligent device causes much noise, affecting a recognition effect.

SUMMARY

An embodiment of this application provides a speech processing method and apparatus and an apparatus for speech processing, which can improve accuracy of intelligent devices for speech recognition.

To resolve the foregoing problem, an embodiment of this application discloses a speech processing method, applied to a terminal device, where the terminal device is equipped with at least two microphones, and the method includes:

- performing summation on signals received by the at least two microphones to obtain a first signal, and performing subtraction on the signals received by the at least two microphones to obtain a second signal;
- performing blind separation on the first signal and the second signal to obtain a speech signal and a noise signal; and
- performing adaptive noise cancellation on the speech signal based on the noise signal to obtain a target speech signal.

According to another aspect, an embodiment of this application discloses a terminal device equipped with at least two microphones, and the terminal device includes:

- a coarse separation module, configured to perform summation on signals received by the at least two microphones to obtain a first signal, and perform subtraction on the signals received by the at least two microphones to obtain a second signal;
- a blind separation processing module, configured to perform blind separation on the first signal and the second signal to obtain a speech signal and a noise signal; and
- an adaptive noise cancellation processing module, configured to perform adaptive noise cancellation on the speech signal based on the noise signal to obtain a target speech signal.

According to still another aspect, an embodiment of this application discloses a terminal device equipped with at least two microphones, the terminal device including one or more processors, a memory and one or more programs, where the one or more programs are stored in the memory and configured to be executed by one or more processors. The one or more programs includes instructions for performing the following operations:

- performing summation on signals received by the at least two microphones to obtain a first signal, and performing subtraction on the signals received by the at least two microphones to obtain a second signal;
- performing blind separation on the first signal and the second signal to obtain a speech signal and a noise signal; and
- performing adaptive noise cancellation on the speech signal based on the noise signal to obtain a target speech signal.

According to yet another aspect, an embodiment of this application discloses a non-transitory computer-readable storage medium, storing instructions, the instructions, when executed by one or more processors of a terminal device, causing the terminal device to perform the foregoing speech processing method according to one or more aspects.

The embodiments of this application include the following advantages:

The speech processing method provided in the embodiments of this application is applicable to a terminal device equipped with at least two microphones. First, two or more microphones of the terminal device may be used to form a differential array to implement coarse separation on a speech signal and a noise signal. Specifically, summation processing is performed on signals received by at least two microphones, a beam may be formed in front of a speaker, which mainly receives speech of the speaker, and suppresses noise in the side rear of the speaker to a certain extent. In this way, a speech-dominated signal (a first signal) may be obtained. Subtraction processing is performed on the signals received by the at least two microphones, a beam may be formed in the side rear of the speaker, which mainly receives noise or interference in the side rear of the speaker. In this way, a noise-dominated signal (a second signal) may be obtained. Next, based on a blind separation technology, the first signal and the second signal obtained through the coarse separation are further separated, and more accurate speech signal and noise signal may be obtained. Finally, adaptive noise cancellation processing is performed on the speech signal and noise signal obtained based on the blind separation, and a target speech signal with noise cancellation may be obtained. In the embodiments of this application, three-stage processing, namely, coarse separation, further separation, and adaptive noise cancellation processing are performed on the signals received by at least two microphones by using a differential microphone array technology in combination with the blind separation technology and an adaptive noise cancellation technology, so that separated speech signal and noise signal are more accurate, thereby improving efficiency and accuracy of cancelling noise or interference in the speech signal. In addition, compared with an existing noise reduction algorithm, the embodiments of this application use the differential microphone array technology to perform the coarse separation on the signals received by the at least two microphones, so that a process of the coarse separation is insensitive to a direction of the noise or interference, which can improve robustness of denoising performance, optimizes a speech denoising effect, thereby improving the speech recognition accuracy of the terminal device in a complex and changeable environment with large noise or strong interference.

The foregoing description is merely an overview of the technical solutions of this application. To understand the technical solutions of this application more clearly, implementation can be performed according to content of the specification. Moreover, to make the foregoing and other objectives, features, and advantages of this application more comprehensible, specific implementations of this application are described below.

BRIEF DESCRIPTION OF THE DRAWINGS

To describe the technical solutions in the embodiments of this application or the related art more clearly, the following briefly introduces the accompanying drawings required for describing the embodiments or the related art. Apparently, the accompanying drawings in the following description are some embodiments in this application, and a person of ordinary skill in the art may still derive other drawings from these accompanying drawings without creative efforts.

To describe the technical solutions in the embodiments of this application more clearly, the following briefly introduces the accompanying drawings required for describing the embodiments of this application. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

Figure 1:
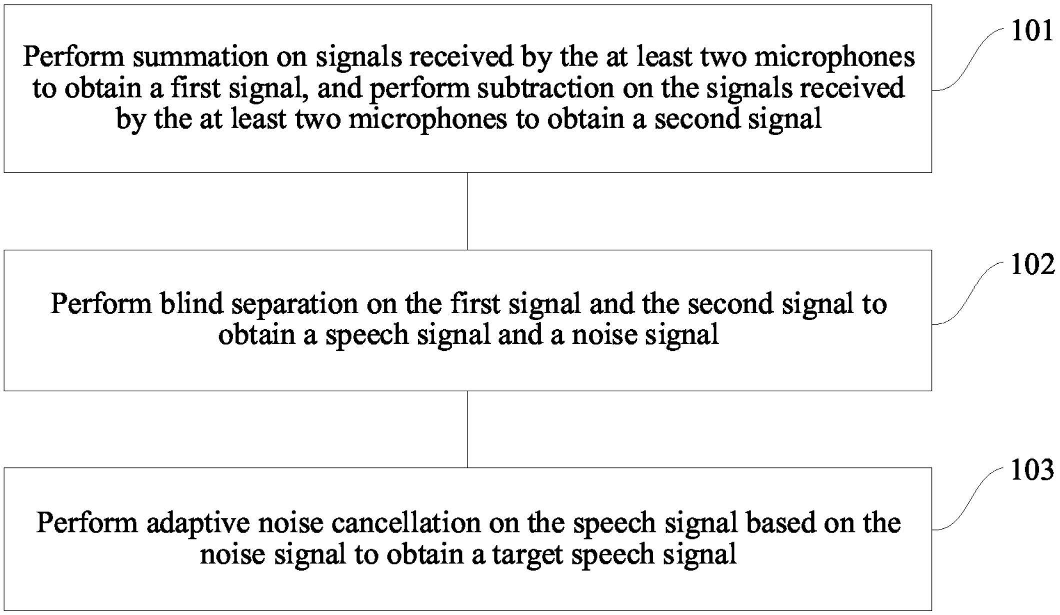
FIG. 1 is a flowchart of an embodiment of a speech processing method according to this application.

FIG. 1 is a flowchart of an embodiment of a speech processing method according to this application. The method is applied to a terminal device. The terminal device is equipped with at least two microphones, and the method may specifically include the following steps:

Step 101. Perform summation on signals received by the at least two microphones to obtain a first signal, and perform subtraction on the signals received by the at least two microphones to obtain a second signal.

Step 102. Perform blind separation on the first signal and the second signal to obtain a speech signal and a noise signal.

Step 103. Perform adaptive noise cancellation on the speech signal based on the noise signal to obtain a target speech signal.

The speech processing method provided in the embodiments of this application may be applied to a terminal device. The terminal device includes at least two microphones and may be configured to collect sound signals. The terminal device includes, but is not limited to: an earphone, a recording pen, a smart household terminal (including an air conditioner, a refrigerator, a rice cooker, a water heater, and the like), a business intelligent terminal (including a videophone, a conference desktop intelligent terminal, and the like), a wearable device (including a smart watch, smart glasses, and the like), a financial intelligent terminal, a smartphone, a tablet computer, a personal digital assistant (PDA), an in-vehicle device, a computer, or the like.

For ease of description, in this embodiment of this application, the description is made by using an example in which the terminal device is an earphone, where the earphone includes at least two microphones.

The speech processing method in this embodiment of this application includes separation modules at three stages. A first-stage separation module performs summation processing and subtraction on signals received by the at least two microphones to obtain a first signal and a second signal, thereby implementing coarse separation on a speech signal and a noise signal. A second-stage separation module further performs, through a blind separation technology, separation on the first signal and the second signal extracted by the first-stage separation module, to obtain a speech signal and a noise signal. A third-stage separation module performs adaptive noise cancellation on the separated speech signal based on the noise signal separated by the second-stage separation module, to obtain a final target speech signal.

In this embodiment of this application, initial extraction is first performed on the signals received by the at least two microphones of the terminal device. Specifically, summation processing is performed on the signals received by the at least two microphones to obtain a first signal, and subtraction processing is performed on the signals received by the at least two microphones to obtain a second signal. The first signal is a speaker speech-dominated signal, and the second signal is a noise-dominated signal.

Taking two microphones as an example, usually one of the two microphones of an earphone is close to a mouth of the speaker. In this embodiment of this application, one microphone close to the mouth of the speaker in the two microphones is referred to as a first microphone, and the other microphone is referred to as a second microphone. In this embodiment of this application, a signal received by the first microphone and a signal received by the second microphone are summed. In this case, a beam is formed in front of a speaker (an end-fire direction), which mainly receives speech of the speaker and suppresses noise in the side rear of the speaker. In this way, a speech-dominated signal (the first signal) may be obtained by performing summation on the signals received by the two microphones.

The signal received by the first microphone is subtracted from the signal received by the second microphone. In this case, a beam is formed behind the speaker, which mainly receives noise or interference behind the speaker. In this way, a noise-dominated signal (the second signal) may be obtained by performing subtraction on the signals received by the two microphones.

Through the initial extraction in step 101, a speaker speech-dominated signal (the first signal) and a noise-dominated signal (the second signal) may be obtained. It is to be understood that, the embodiments of this application implement coarse separation on the speech signal and the noise signal by extracting the first signal and the second signal. The first signal is a speaker speech-dominated signal, which still includes a part of the noise signal. The second signal is a noise-dominated signal, which still includes a part of the speech signal.

It is to be noted that, when there are more than two microphones, a manner of extracting the first signal is the same as the manner performed when there are two microphones, and a manner of extracting the second signal is slightly different from the manner performed when there are two microphones.

In an exemplary embodiment of this application, the method may further include: performing phase alignment on the signals received by the at least two microphones.

In step 101, the performing summation on signals received by the at least two microphones to obtain a first signal, and performing subtraction on the signals received by the at least two microphones to obtain a second signal may specifically include:

performing summation on signals received by the at least two microphones after phase alignment to obtain a first signal, and performing subtraction on the signals received by the at least two microphones after phase alignment to obtain a second signal.

In an actual application, because a position of each microphone of the terminal device is different, there is a time difference between signals received by microphones, that is, phases of the signals received by the microphones are not aligned. Summation processing or subtraction processing are directly performed on signals received by a plurality of microphones. Although white noise may be reduced to a certain extent, if the subtraction processing is directly performed when phases are not aligned, the target speech signal may leak to the noise-dominated signal, which affects accuracy of the second signal, and then affects a final noise reduction effect. Therefore, in this embodiment of this application, before summation processing and subtraction processing are performed on signals received by at least two microphones, phase alignment is performed on the signals received by the at least two microphones to obtain signals received by the at least two microphones after phase alignment. Further, summation processing is performed on the signals received by the at least two microphones after phase alignment to obtain a first signal, and subtraction processing is performed on the signals received by the at least two microphones after phase alignment to obtain a second signal, to improve the accuracy of extracting the first signal and the second signal, thereby improving the noise reduction effect of the speech signal.

In this embodiment of this application, summation processing and subtraction processing are performed on the signals received by the at least two microphones, so that there is no need to estimate a time difference between signals received by different microphones, steps of noise reduction processing can be simplified, and the obtained first signal and second signal may be used as auxiliary estimation for further noise reduction, to improve the final noise reduction effect.

At a stage of coarse separation described in step 101, a process of performing summation on signals received by two microphones is the same as that of performing summation on signals received by more than two microphones. The following respectively describes a specific process of performing subtraction on the signals received by the two microphones and a specific process of performing subtraction on the signals received by the more than two microphones.

In an exemplary embodiment of this application, the terminal device is equipped with two microphones. In step 101, the performing subtraction on the signals received by the at least two microphones to obtain a second signal includes:

Step S11. Determine a first microphone and a second microphone in the two microphones.

Step S12. Subtract each frame signal received by the first microphone from each frame signal received by the second microphone to obtain a second signal.

When a terminal device is equipped with two microphones, a first microphone and a second microphone are determined in the two microphones. The first microphone is a microphone close to the mouth of the speaker in the two microphones, and the second microphone is a microphone away from the mouth of the speaker in the two microphones. The two microphones are in a straight line.

In a specific implementation, phase alignment operation is first performed on a signal received by the first microphone and a signal received by the second microphone to obtain signals of the two microphones after phase alignment. Then, summation processing is performed on the signals of the two microphones after phase alignment to obtain a first signal, which forms suppression on white noise. Subtraction processing is performed on the signals of the two microphones after phase alignment. Specifically, the signal received by the first microphone is subtracted from the signal received by the second microphone to obtain a second signal.

Further, in the embodiments of this application, a signal received by each microphone of the terminal device is processed in a frame unit, to process the signal received by the microphone in real time, thereby improving real-time performance and accuracy of the processing. Specifically, each frame signal received by the first microphone is subtracted from each frame signal received by the second microphone to obtain the second signal.

In an exemplary embodiment of this application, the terminal device is equipped with n microphones, n being greater than 2. In step 101, the performing subtraction on the signals received by the at least two microphones to obtain a second signal includes:

Step S21. Subtract a current frame signal received by an $(i-1)^{th}$ microphone from a current frame signal received by an $i^{th}$ microphone to obtain n−1 frame signals, i being in a range of 1 to n.

Step S22. Perform adaptive filtering on the n−1 frame signals and a reference signal y(n) to obtain processed n−1 frame signals, where y(n)=yc(n)−n(n), yc(n) is a sum of previous frame signals received by the n microphones, and N(n) is a second frame signal outputted in a previous frame.

Step S23. Perform summation on the processed n−1 frame signals to obtain a second frame signal outputted in a current frame.

Step S24. Process all frame signals received by the n microphones to obtain the second signal.

When the terminal device includes more than two microphones, phase alignment is first performed on signals received by all the microphones to obtain the signals of all the microphones after phase alignment. Then, summation processing is performed on the signals of all the microphones after phase alignment to obtain a first signal, which forms suppression on white noise. Subtraction processing is performed on the signals of all the microphones after phase alignment. Specifically, each frame of the signals of all the microphones after phase alignment is performed the following operations: subtracting a current frame signal received by an $(i-1)^{th}$ microphone from a current frame signal received by an $i^{th}$ microphone to obtain n−1 frame signals, i being in a range of 1 to n; performing adaptive filtering on the n−1 frame signals and a reference signal y(n) to obtain processed n−1 frame signals; and performing summation on the processed n−1 frame signals to obtain the second frame signal outputted in the current frame. The reference signal y(n)=yc(n)−n(n), yc(n) is a sum of previous frame signals received by the n microphones, and N(n) is a second frame signal outputted in a previous frame. The embodiments of this application calculate the reference signal y(n) of the current frame by using a processing result of the previous frame, and update an adaptive filter with y(n).

It is to be noted that, when a first frame signal is processed, because the processing result of the previous frame has not been generated, an initial reference signal y(n) may be set, and when processing a second frame signal after the processing of the first frame signal is completed, the adaptive filter may be updated with the y(n) calculated from the first frame. Similarly, when a third frame signal is processed, the adaptive filter may be updated with y(n) calculated from the second frame, and so on, until processing of the last frame signal is completed. In this way, a complete second signal can be obtained.

Embodiments of this application do not limit the type of the adaptive filter used in the subtraction processing, for example, normalized least mean square (NLMS) may be used.

Figure 2:
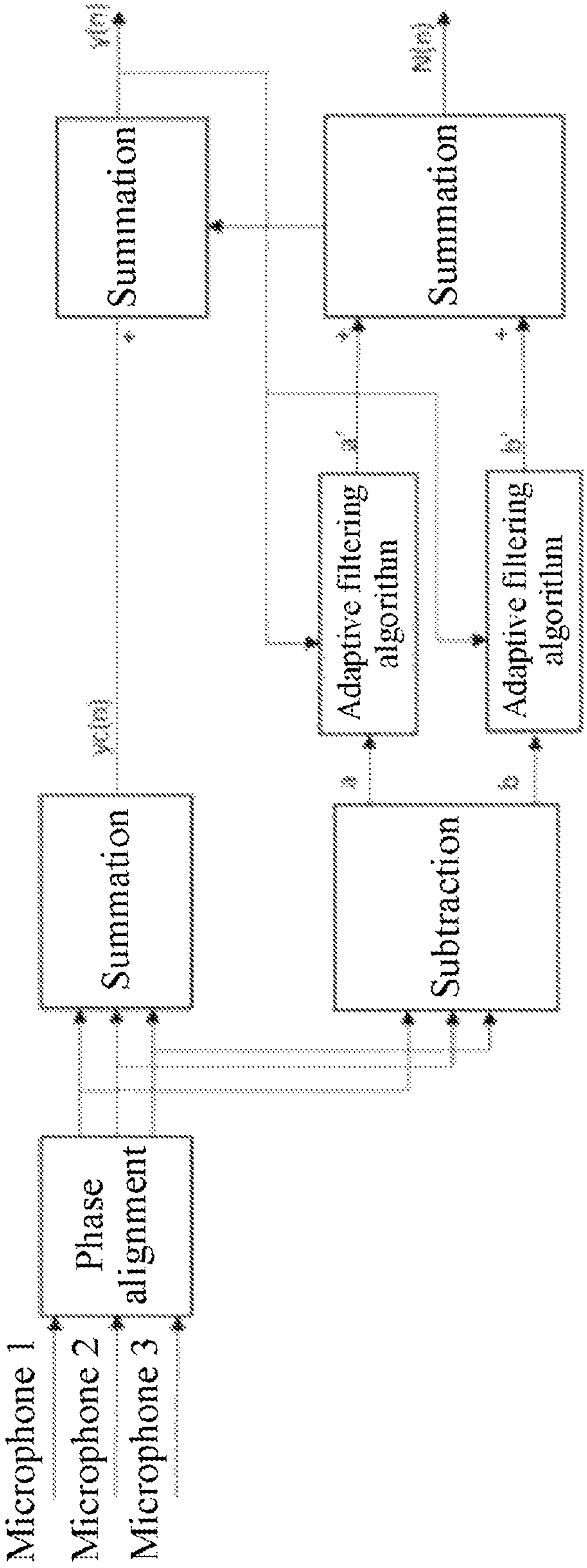
FIG. 2 is a schematic flowchart of performing subtraction on signals of three microphones according to this application.

Taking three microphones as an example, a specific process of subtraction processing of signals received by the three microphones of the terminal device in the embodiments of this application is explained. FIG. 2 is a schematic flowchart of performing subtraction on signals of three microphones according to an embodiment of this application. As shown in FIG. 2, the three microphones are respectively a microphone 1, a microphone 2, and a microphone 3.

First, phase alignment is performed on signals received by the microphone 1, the microphone 2, and the microphone 3, and then the signals of the three microphones after phase alignment are summed to obtain a first signal to suppress white noise, and subtraction processing is performed on the signals of the three microphones after phase alignment. The subtraction processing specifically includes: subtracting a signal of the microphone 1 from a signal of the microphone 2 to obtain a signal a; and subtracting the signal of microphone 2 from a signal of the microphone 3 to obtain a signal b. Adaptive filtering processing is performed on the signal a and the signal b and the reference signal y(n) to obtain a signal a' and a signal b', and the signal a' and the signal b' are summed to obtain a second signal.

As shown in FIG. 2, in a specific embodiment, the following operations may be performed on the first frame signal: firstly, adaptive filtering processing (the adaptive filter has an initial state during first calculation) is performed to calculate N(n) is calculated. Then, summing calculation is performed to obtain yc(n), and y(n) is obtained after subtracting yc(n) and N(n). Next, the adaptive filter is updated with the calculated y(n). In this case, the subtraction on the first frame signal is completed to obtain a second frame signal outputted in a first frame. Then, the following frame signals are processed according to the foregoing steps in turn. When processing the second frame signal, reference may be made to a processing result of the first frame signal, when processing the third frame signal, reference may be made to a processing result of the second frame signal, and so on, until processing of the last frame signal is completed, a complete second signal can be obtained.

Embodiments of this application implement coarse separation on the speech signal and the noise signal by extracting the first signal and the second signal. After the first signal and the second signal are extracted, blind separation processing may be performed on the first signal and the second signal, to further separate the speech signal and the noise signal to obtain more an accurate speech signal and noise signal.

The blind separation processing refers to a technology of separating each source signal (for example, a speech signal and noise signal of the speaker) from collected mixed signal when the source signal cannot be accurately acquired. Because the microphones in the earphone generally have a small aperture and a quantity of microphones is usually small, in a noisy environment, the collected sound signal includes a large quantity of noise signals, resulting in poor quality of the speech signal. To improve the quality of the speech signal, the embodiments of this application perform blind separation on the extracted first signal and the second signal, the blind separation on the first signal may further reduce noise signals in the first signal to obtain a speech signal, where the speech signal includes less noise; and the blind separation on the second signal may further reduce the speech signals in the second signal to obtain a noise signal, where the noise signal includes less speech and provides a foundation for subsequent noise reduction.

In an exemplary embodiment of this application, in step 102, the performing blind separation on the first signal and the second signal to obtain a speech signal and a noise signal includes:

performing the blind separation on each frame signal in the first signal by using an independent vector analysis blind separation algorithm to obtain the speech signal, and performing the blind separation on each frame signal in the second signal by using the independent vector analysis blind separation algorithm to obtain the noise signal.

The independent component correlation algorithm (ICA) refers to that when components of the source signal are statistically independent of each other and have no time structure, under a certain separation criterion, the dependence between different components of the transformed signal is minimized through a feedback adjustment of neural network weights, that is, an output is as independent as possible. An objective of the ICA is to maximize the statistical independence of each component of an observed signal through linear transformation. If there is statistical independence between the source signals, signal separation may be implemented through the ICA. However, an inevitable problem of the ICA is that separated signals are mixed because of an inconsistent sequence thereof. Therefore, the embodiments of this application adopt an independent vector analysis (IVA) blind separation algorithm. IVA is an extended ICA algorithm, and the WA uniformly separates and calculates all frequency points of each frame in consideration of a correlation between frequency components belonging to the same source, thereby effectively avoiding a ranking fuzziness problem.

The second-stage separation module of the embodiments of this application adopts the IVA (Independent Vector Analysis Technology) to perform blind separation on the first signal to obtain the speech signal, and to perform blind separation on the second signal to obtain the noise signal. The IVA blind separation technology adopted in the embodiments of this application is not sensitive to a direction of the noise, and a robust separation effect on the noise in front of the speaker can still be achieved, which further improves an effect of speech noise reduction.

It is to be noted that, a type of the adopted blind separation algorithm is not limited in this embodiment of this application, for example, a blind separation algorithm such as a principal component analysis (PCA) may further be adopted.

In an exemplary embodiment of this application, in step 103, the performing adaptive noise cancellation on the speech signal based on the noise signal to obtain a target speech signal includes:

using the noise signal as a reference signal and using the speech signal as a target signal, and performing the adaptive noise cancellation on the speech signal based on an adaptive filtering algorithm of a recursive least squares algorithm (RLS) to obtain the target speech signal.

The adaptive noise cancellation processing of the embodiments of this application adopts a recursive least squares (RLS) technology, and an RLS algorithm has a characteristic of fast convergence.

Specifically, an RLS adaptive filtering algorithm is as follows:

1. Initialization:

$P(0)=\delta^{-1}I$, δ is a very small normal number, and I is a unit matrix $W(0)=0$ 2. Based on n=1, 2, . . . , N, the following calculation is performed:

$$G(n) = \frac{\lambda^{-1}P(n-1)X(n)}{1+\lambda^{-1}X^T(n)P(n-1)X(n)} \tag{1}$$

$$e(n) = d(n) - W^T(n-1)X(n) \tag{2}$$

$$W(n) = W(n-1) + G(n)e(n) \tag{3}$$

$$P(n) = \lambda^{-1}P(n-1) - \lambda^{-1}G(n)X^T(n)P(n-1) \tag{4}$$

$$s(n) = d(n) - W^T(n)X(n) \tag{5}$$

n represents a frame number, W represents a coefficient vector of an adaptive filter, and G represents a gain vector. X represents a noise signal outputted through blind separation. In Formula (3), d represents a speech signal outputted through blind separation. s(n) is a target speech signal that is finally outputted. A forgetting factor λ may be selected as a constant such as 0.99.

However, the RLS adaptive filtering algorithm has a large calculation amount, and a calculation pressure is high for a terminal device with limited computing power such as an earphone. Therefore, in order to reduce the calculation amount of the adaptive filtering processing and make the speech processing method in the embodiments of this application applicable to terminal devices with different calculation capabilities, the embodiments of this application introduce a voice activity detection module to reduce the calculation amount of the RLS adaptive filtering algorithm.

In an exemplary embodiment of this application, in step 102, after the performing blind separation on the first signal and the second signal to obtain a speech signal and a noise signal, the method may further include:

Step S31. Perform voice activity detection on each frame signal in the speech signal.

Step S32. Set a voice signal flag bit for a frame signal whose voice activity detection result is a voice signal.

In step 103, the performing adaptive noise cancellation on the speech signal includes: performing the adaptive noise cancellation on a frame signal having a voice signal flag bit in the speech signal.

An objective of voice activity detection (VAD) is to detect whether the current speech signal includes the voice signal, that is, to determine an input signal and distinguish the voice signal from various background noise signals.

In a specific implementation, not each frame signal of the sound signal received by the microphone includes the voice signal of the speaker. If adaptive noise cancellation processing is performed on the frame signal, it will not only increase an extra calculation cost, but also affect the efficiency of speech processing. Therefore, the embodiments of this application perform voice activity detection on the speech signal obtained by the blind separation processing to detect whether the current frame signal includes the voice signal, and only a frame signal including the voice signal is performed the adaptive noise cancellation processing, to reduce the calculation cost and improve the efficiency of the speech processing.

In the embodiments of this application, before the speech signal and the noise signal separated by the second-stage separation module are inputted into the adaptive noise cancellation module (the third-stage separation module), the speech signal separated by the second-stage separation module is first inputted into the voice activity detection module. The voice activity detection module is responsible for detecting whether each frame signal includes a voice signal on the inputted speech signal in a frame unit, and a voice signal flag bit is set for a frame signal whose voice activity detection result is a voice signal. Then, voice activity detection results of each frame signal are transmitted to the adaptive noise cancellation module, and the adaptive noise cancellation module determines whether to perform the adaptive noise cancellation processing according to whether the voice activity detection result includes the voice signal flag bit.

The voice activity detection module may use a voice time domain-based energy algorithm to set a threshold and calculate an energy of the current frame signal. For example, if a current frame signal x has N points, n=1, 2, 3, . . . , N, then the energy of the current frame signal energy=sum(x[n]*x[n]), that is, the energy of all points in a frame is summed. If energy>threshold, it is determined that the current frame signal includes a voice signal, and a voice signal flag bit may be set for the current frame signal; otherwise, it is determined that the current frame signal does not include a voice signal, and the voice signal flag bit is not set for the current frame signal.

In an actual application, because the updating of an adaptive filter coefficient needs a convergence time, the voice activity detection module may in a non-operating state in a preset time period (such as the first 20 s) before starting performing the adaptive noise cancellation processing, and the adaptive filter is updated all the time. After the preset time period (20 s), whether to perform the adaptive noise cancellation processing depends on the voice signal flag bit. Therefore, it can not only save processing time and reduce power consumption, but also update the adaptive filter coefficient more accurately and improve the robustness of the algorithm.

In some embodiments, an active window policy may be used, and a sliding window may store voice signal flag bits of a past preset quantity of frames (such as 5 frames to 10 frames) and the voice signal flag bit of the current frame. Adaptive noise cancellation processing is performed and the adaptive filter coefficient is updated only when all the frame signals in the sliding window have voice signal flag bits, that is, all the frame signals in the sliding window include voice signals.

The embodiments of this application combines a differential microphone array technology with the adaptive filtering technology to quickly eliminate the noise or interference in speech based on the blind separation technology. Compared with the prior algorithm, the embodiments of this application is insensitive to the direction of noise or interference, and the denoising performance is more robust.

In an example, taking two microphones as an example, a phase alignment operation is first performed on a signal received by the first microphone and a signal received by the second microphone to obtain signals of the two microphones after phase alignment. Summation processing is performed on the signals of the two microphones after phase alignment to obtain the first signal, and the signal received by the first microphone is subtracted from the signal received by the second microphone to obtain the second signal. Assuming that the signals received by the two microphones include a speech signal of girl A and a speech signal of boy B, where the speech signal of the boy B is a speech signal of a target speaker to be extracted. Through the processing of the first-stage separation module, the first signal mainly based on the speech signal of a boy and the second signal mainly based on the speech signal of a girl are obtained. In this example, compared with the speech signal of the boy, the speech signal of the girl may be processed as the noise signal.

Then, the first signal mainly based on the speech signal of the boy and the second signal mainly based on the speech signal of the girl are inputted to a blind separation processing module for performing the blind separation processing. After being processed by the blind separation processing module, the speech signal of the girl in the first signal is further reduced to obtain the speech signal; and after being processed by the blind separation processing module, the speech signal of the boy in the second signal is further reduced to obtain the noise signal.

Next, the speech signal and the noise signal outputted by the blind separation processing module are inputted into an adaptive noise cancellation processing module, and the speech signal outputted by the blind separation processing module is inputted into a voice activity detection module for performing the voice activity detection. The voice activity detection module inputs a result of the voice activity detection of each frame signal into the adaptive noise cancellation processing module. The adaptive noise cancellation processing module determines whether adaptive noise cancellation processing is performed on the current frame according to whether the result of the voice activity detection outputted by the voice activity detection module includes a voice signal flag bit.

Figure 3:
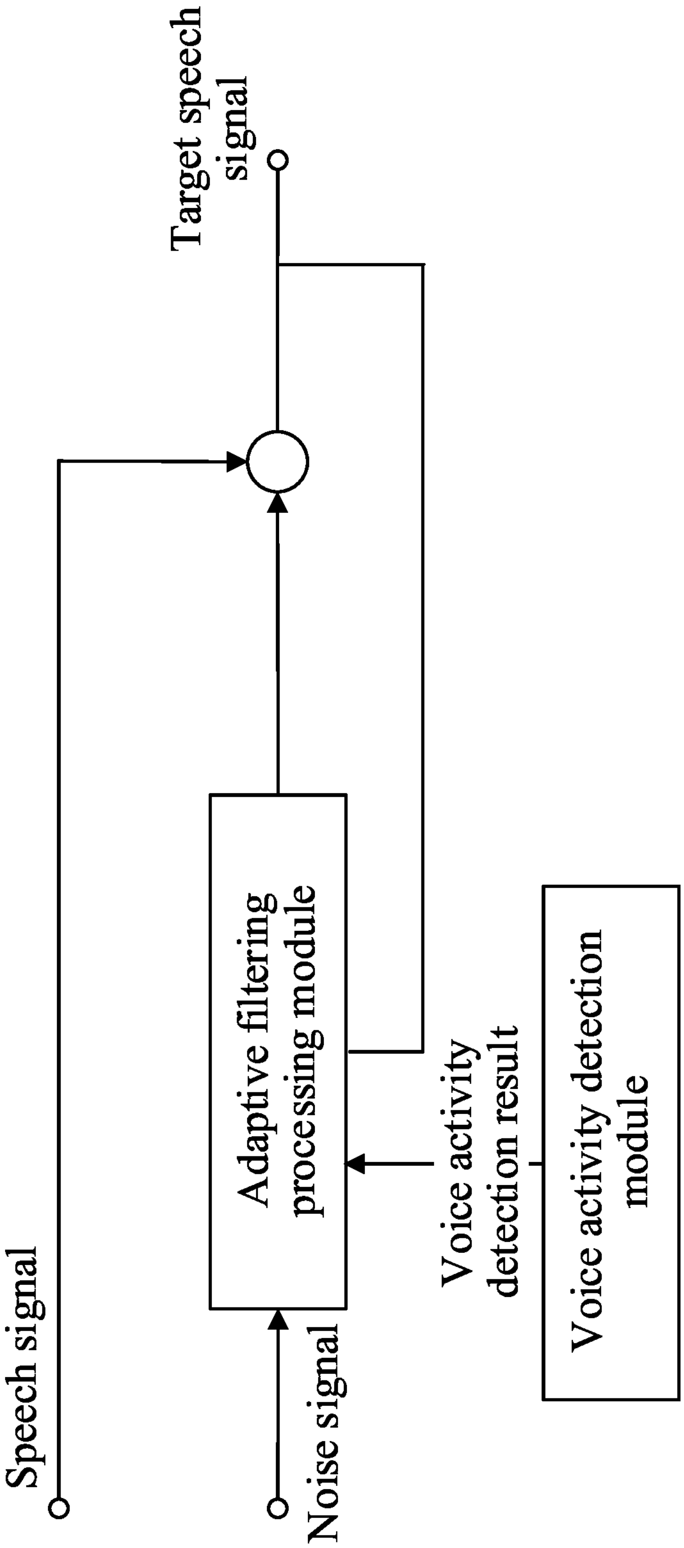
FIG. 3 is a schematic flowchart of a signal inflow of an adaptive noise cancellation processing module according to this application.

FIG. 3 is a schematic flowchart of a signal inflow of an adaptive noise cancellation processing module. The speech signal and the noise signal outputted by the blind separation processing module and the voice activity detection results of each frame signal outputted by the speech activity detection module are used as inputs in FIG. 4, to finally output the target speech signal.

In summary, the speech processing method provided in the embodiments of this application is applicable to a terminal device equipped with at least two microphones. First, two or more microphones of the terminal device may be used to form a differential array to implement coarse separation on a speech signal and a noise signal. Specifically, summation processing is performed on signals received by at least two microphones, a beam may be formed in front of a speaker, which mainly receives speech of the speaker, and suppresses noise in the side rear of the speaker to a certain extent. In this way, a speech-dominated signal (a first signal) may be obtained. Subtraction processing is performed on the signals received by the at least two microphones, a beam may be formed in the side rear of the speaker, which mainly receives noise or interference in the side rear of the speaker. In this way, a noise-dominated signal (a second signal) may be obtained. Next, based on the blind separation technology, the first signal and the second signal obtained through the coarse separation are further separated, and more accurate speech signal and noise signal may be obtained. Finally, adaptive noise cancellation processing is performed on the speech signal and noise signal obtained based on the blind separation, and a target speech signal with noise cancellation may be obtained. In the embodiments of this application, three-stage processing, namely, coarse separation, further separation, and adaptive noise cancellation processing are performed on the signals received by at least two microphones by using a differential microphone array technology in combination with the blind separation technology and an adaptive noise cancellation technology, so that separated speech signal and noise signal are more accurate, thereby improving efficiency and accuracy of cancelling noise or interference in the speech signal. In addition, compared with an existing noise reduction algorithm, the embodiments of this application use the differential microphone array technology to perform the coarse separation on the signals received by the at least two microphones, so that a process of the coarse separation is insensitive to a direction of the noise or interference, which can improve robustness of denoising performance, optimizes a speech denoising effect, thereby improving the speech recognition accuracy of the terminal device in a complex and changeable environment with large noise or strong interference.

It is to be noted that for the sake of simple description, the method embodiments are all described as a series of action combinations. However, those skilled in the art is to know that the embodiments of this application are not limited by the described action sequence because some steps may be performed in other sequences or simultaneously according to the embodiments of this application. In addition, a person skilled in the art is to also know that the embodiments described in the specification are all preferred embodiments, and the actions involved are not necessarily required by the embodiments of this application.

Figure 4:
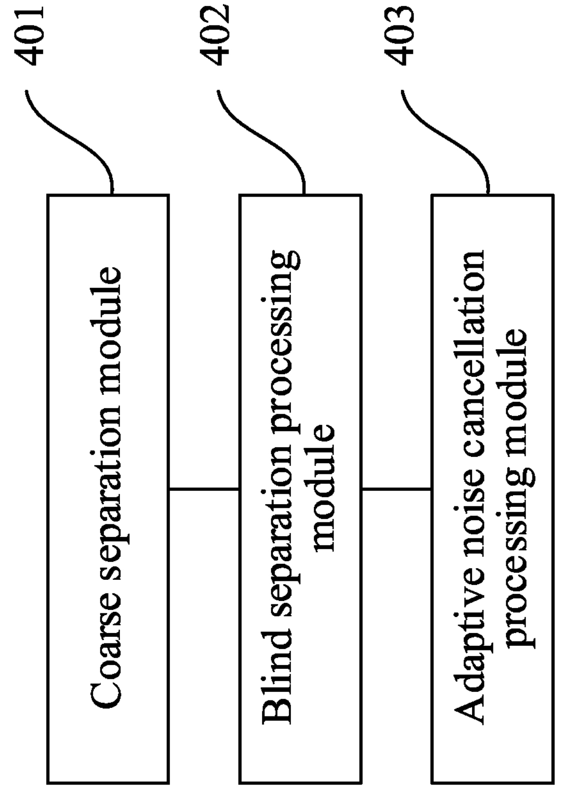
FIG. 4 is a structural block diagram of an embodiment of a speech processing apparatus according to this application.

FIG. 4 is a structural block diagram of an embodiment of a speech processing apparatus according to this application. The apparatus may be applied to a terminal device, where the terminal device is equipped with at least two microphones, and the apparatus may include:

a coarse separation module 401, configured to perform summation on signals received by the at least two microphones to obtain a first signal, and perform subtraction on the signals received by the at least two microphones to obtain a second signal;

a blind separation processing module 402, configured to perform blind separation on the first signal and the second signal to obtain a speech signal and a noise signal; and an adaptive noise cancellation processing module 403, configured to perform adaptive noise cancellation on the speech signal based on the noise signal to obtain a target speech signal.

In some embodiments, the apparatus further includes:

a phase alignment module, configured to perform phase alignment on the signals received by the at least two microphones; and the coarse separation module, further configured to perform the summation on signals received by the at least two microphones after phase alignment to obtain the first signal, and perform the subtraction on the signals received by the at least two microphones after phase alignment to obtain the second signal.

In some embodiments, the terminal device is equipped with two microphones, and the blind separation processing module includes:

a determining submodule is configured to determine a first microphone and a second microphone in the two microphones; and a first subtraction submodule is configured to subtract each frame signal received by the first microphone from each frame signal received by the second microphone to obtain the second signal.

In some embodiments, the terminal device is equipped with n microphones, n being greater than 2, and the blind separation processing module includes:

a second subtraction submodule, configured to subtract a current frame signal received by an $(i-1)^{th}$ microphone from a current frame signal received by an $i^{th}$ microphone to obtain n−1 frame signals, i being in a range of 1 to n;

an adaptive filtering submodule, configured to perform adaptive filtering on the n−1 frame signals and a reference signal y(n) to obtain processed n−1 frame signals, where y(n)=yc(n)−n(n), yc(n) is a sum of previous frame signals received by the n microphones, and N(n) is a second frame signal outputted in a previous frame;

a summation submodule, configured to perform summation on the processed n−1 frame signals to obtain a second frame signal outputted in a current frame; and an iteration completion submodule, configured to process all frame signals received by the n microphones to obtain the second signal.

In some embodiments, the blind separation processing module is further configured to perform the blind separation on each frame signal in the first signal by using an independent vector analysis blind separation algorithm to obtain the speech signal, and perform the blind separation on each frame signal in the second signal by using the independent vector analysis blind separation algorithm to obtain the noise signal.

In some embodiments, the apparatus further includes:

a voice activity detection module, configured to perform voice activity detection on each frame signal in the speech signal; and set a voice signal flag bit for a frame signal whose voice activity detection result is a voice signal; and the adaptive noise cancellation processing module, further configured to perform the adaptive noise cancellation on a frame signal having a voice signal flag bit in the speech signal.

In some embodiments, the adaptive noise cancellation processing module is further configured to use the noise signal as a reference signal and use the speech signal as a target signal, and perform the adaptive noise cancellation on the speech signal based on an adaptive filtering algorithm of a recursive least squares algorithm RLS to obtain the target speech signal.

The embodiments of this application use two or more microphones of the terminal device to form a differential array. Based on the blind separation technology, combining the differential microphone array technology and the adaptive filtering technology, the noise or interference in the speech may be quickly eliminated. Compared with the prior algorithm, the embodiments of this application is insensitive to the direction of the noise or interference, the denoising performance is more robust, the speech denoising effect is optimized, thereby improving the speech recognition accuracy of the terminal device in a complex and changeable environment with large noise or strong interference.

As for the apparatus embodiment, since it is basically similar to the method embodiment, the description is relatively simple. For the related parts, reference is made to the description of the method embodiment.

The various embodiments in this specification are all described in a progressive manner. Descriptions of each embodiment focus on differences from other embodiments, and same or similar parts among respective embodiments may be mutually referenced.

Specific operation execution manners of the modules in the apparatus in the foregoing embodiment have been described in detail in the embodiment about the method, and details will not be described herein again.

An embodiment of this application provides an apparatus for speech processing, which is applied to a terminal device. The terminal device is equipped with at least two microphones, and the apparatus includes a memory and one or more programs, where the one or more programs are stored in the memory, and are configured to be executed by the one or more processors. The one or more programs include instructions for performing the following operations: performing summation on signals received by the at least two microphones to obtain a first signal, and performing subtraction on the signals received by the at least two microphones to obtain a second signal; performing blind separation on the first signal and the second signal to obtain a speech signal and a noise signal; and performing adaptive noise cancellation on the speech signal based on the noise signal to obtain a target speech signal.

Figure 5:
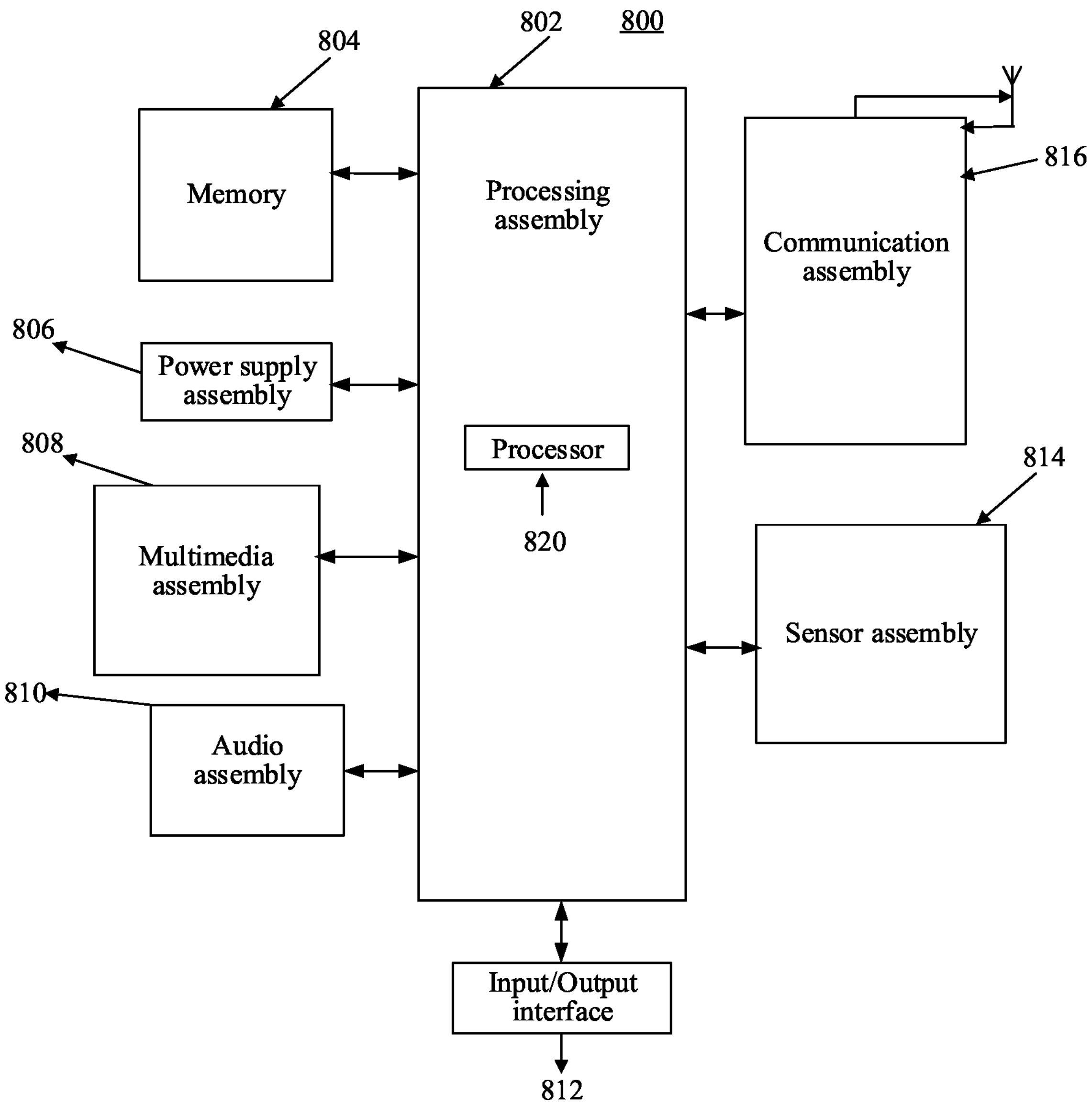
FIG. 5 is a block diagram of an apparatus 800 for speech processing according to this application.

FIG. 5 is a block diagram of an apparatus 800 for speech processing according to an exemplary embodiment. For example, the apparatus 800 may be a mobile phone, a computer, a digital broadcasting terminal, a messaging transceiver, a game console, a tablet device, a medical device, a fitness facility, a personal digital assistant, or the like.

Referring to FIG. 5, the apparatus 800 may include one or more of the following assemblies: a processing assembly 802, a memory 804, a power supply assembly 806, a multimedia assembly 808, an audio assembly 810, an input/output (I/O) interface 812, a sensor assembly 814, and a communication assembly 816.

The processing assembly 802 usually controls the whole operation of the apparatus 800, such as operations associated with displaying, a phone call, data communication, a camera operation, and a recording operation. The processing assembly 802 may include one or more processors 820 to perform instructions, to complete all or some steps of the foregoing method. In addition, the processing assembly 802 may include one or more modules, to facilitate the interaction between the processing assembly 802 and other assemblies. For example, the processing assembly 802 may include a multimedia module, to facilitate the interaction between the multimedia assembly 808 and the processing assembly 802.

The memory 804 is configured to store data of various types to support operations on the apparatus 800. Examples of the data include instructions of any application program or method that are configured to be operated on the apparatus 800, such as contact data, address book data, a message, a picture, and a video. The memory 804 can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc.

The power supply assembly 806 provides power to various assemblies of the apparatus 800. The power supply assembly 806 may include a power supply management system, one or more power supplies, and other assemblies associated with generating, managing and allocating power for the apparatus 800.

The multimedia assembly 808 includes a screen providing an output interface between the apparatus 800 and a user. In some embodiments, the screen may include a liquid crystal display (LCD) and a touch panel (TP). If the screen includes a TP, the screen may be implemented as a touchscreen, to receive an input signal from the user. The TP includes one or more touch sensors to sense touching, sliding, and gestures on the TP. The touch sensor may not only sense the boundary of touching or sliding operations, but also detect duration and pressure related to the touching or sliding operations. In some embodiments, the multimedia assembly 808 includes a front-facing camera and/or a rear-facing camera. When the apparatus 800 is in an operation mode, such as a shooting mode or a video mode, the front-facing camera and/or the rear-facing camera may receive external multimedia data. Each front-facing camera and rear-facing camera may be a fixed optical lens system or have a focal length and an optical zooming capability.

The audio assembly 810 is configured to output and/or input an audio signal. For example, the audio assembly 810 includes a microphone (MIC), and when the apparatus 800 is in an operation mode, such as a call mode, a recording mode, and a voice identification mode, the MIC is configured to receive an external audio signal. The received audio signal may be further stored in the memory 804 or transmitted through the communication assembly 816. In some embodiments, the audio assembly 810 further includes a loudspeaker, configured to output an audio signal.

The I/O interface 812 provides an interface between the processing assembly 802 and an external interface module. The external interface module may be a keyboard, a click wheel, buttons, or the like. The buttons may include, but not limited to: a homepage button, a volume button, a start-up button, and a locking button.

The sensor assembly 814 includes one or more sensors, configured to provide state evaluation in each aspect to the apparatus 800. For example, the sensor assembly 814 may detect an opened/closed status of the apparatus 800, and relative positioning of the assembly. For example, the assembly is a display and a small keyboard of the apparatus 800. The sensor assembly 814 may further detect a position change of a speech processing apparatus 800 or one assembly of the apparatus 800, an existence or nonexistence of contact between the user and the apparatus 800, an azimuth or acceleration/deceleration of the apparatus 800, and a temperature change of the apparatus 800. The sensor assembly 814 may include a proximity sensor, configured to detect the existence of nearby objects without any physical contact. The sensor assembly 814 may further include an optical sensor, such as a CMOS or CCD image sensor, configured to be used in an imaging application. In some embodiments, the sensor assembly 814 may further include an acceleration sensor, a gyroscope sensor, a magnetic sensor, a pressure sensor, or a temperature sensor.

The communication assembly 816 is configured to facilitate communication in a wired or wireless manner between the apparatus 800 and other devices. The apparatus 800 may access a wireless network based on communication standards, such as Wi-Fi, 2G, or 3G, or a combination thereof. In an exemplary embodiment, the communication component 816 receives a broadcast signal or broadcast related information from an external broadcast management system through a broadcast channel. In an exemplary embodiment, the communication assembly 816 further includes a near field communication (NFC) module, to promote short range communication. For example, the NFC module may be implemented based on a radio frequency identification (RFID) technology, an infra-red data association (IrDA) technology, an ultra wideband (UWB) technology, a Bluetooth (BT) technology, and other technologies.

In an exemplary embodiment, the apparatus 800 can be implemented as one or more application specific integrated circuit (ASIC), a digital signal processor (DSP), a digital signal processing device (DSPD), a programmable logic device (PLD), a field programmable gate array (FPGA), a controller, a micro-controller, a microprocessor or other electronic element, so as to perform the foregoing method.

In an exemplary embodiment, a non-transitory computer readable storage medium including instructions, for example, a memory 804 including instructions, is further provided, and the foregoing instructions may be performed by a processor 820 of the apparatus 800 to complete the foregoing method. For example, the non-transitory computer readable storage medium may be a ROM, a random access memory (RAM), a CD-ROM, a magnetic tape, a floppy disk, an optical data storage device, or the like.

Figure 6:
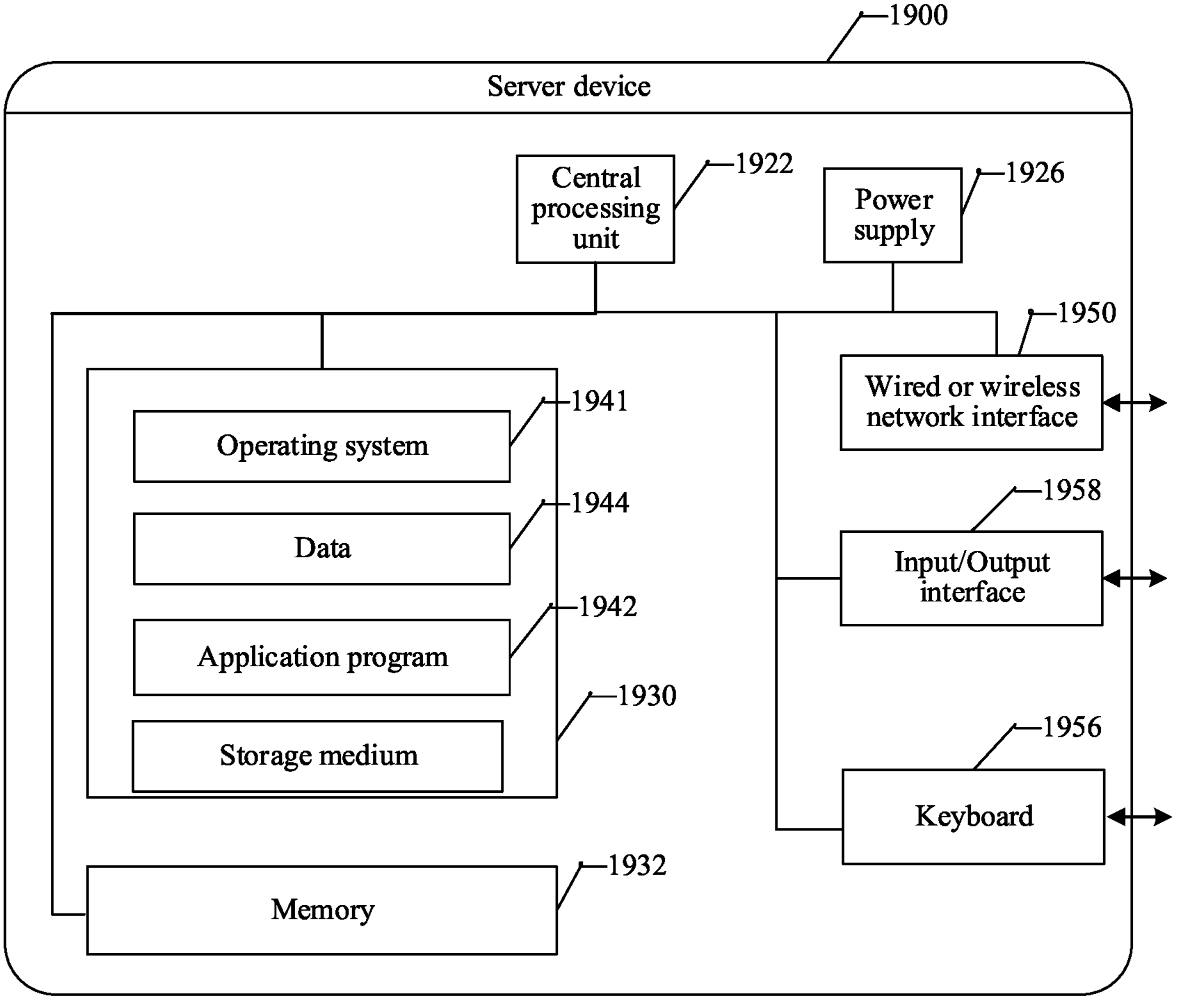
FIG. 6 is a schematic structural diagram of a server according to some embodiments of this application.

FIG. 6 is a schematic structural diagram of a server according to some embodiments of this application. The server 1900 may vary greatly due different configurations or performance, and may include one or more central processing units (CPU) 1922 (for example, one or more processors) and a memory 1932, and one or more storage media 1930 (for example, one or more mass storage devices) that store application programs 1942 or data 1944. The memory 1932 and the storage medium 1930 may be transient or persistent storages. A program stored in the storage medium 1930 may include one or more modules (not shown in the figure), and each module may include a series of instruction operations for the server. Further, the central processing unit 1922 may be configured to communicate with the storage medium 1930, and perform, on the server 1900, the series of instruction operations stored in the storage medium 1930.

The server 1900 may further include one or more power supplies 1926, one or more wired or wireless network interfaces 1950, one or more input/output interfaces 1958, one or more keyboards 1956, and/or, one or more operating systems 1941, for example, Windows Server™, Mac OS X™, Unix™, Linux™, and FreeBSD™.

When the instructions in the storage medium are executed by a processor of an apparatus (a server or a terminal), the non-transitory computer readable storage medium enables the apparatus to perform the speech processing method shown in FIG. 1.

When the instructions in the storage medium are executed by a processor of an apparatus (a server or a terminal), the non-transitory computer readable storage medium enables the apparatus to perform the speech processing method. The method includes: performing summation on signals received by the at least two microphones to obtain a first signal, and performing subtraction on the signals received by the at least two microphones to obtain a second signal; performing blind separation on the first signal and the second signal to obtain a speech signal and a noise signal; and performing adaptive noise cancellation on the speech signal based on the noise signal to obtain a target speech signal.

The embodiments of this application are described with reference to flowcharts and/or block diagrams of the method, the terminal device (system), and the computer program product according to the embodiments of this application. It is to be understood that, computer program instructions can implement each procedure and/or block in the flowcharts and/or block diagrams, and a combination of procedures and/or blocks in the flowcharts and/or block diagrams. These computer program instructions may be provided for a general-purpose computer, a dedicated computer, an embedded processor, or a processor of any other programmable data processing terminal device to produce a machine, so that the instructions executed by a computer or a processor of any other programmable data processing terminal device produce an apparatus for implementing a specified function in one or more processes in the flowcharts and/or in one or more blocks in the block diagrams.

These computer program instructions may also be stored in a computer-readable memory that can guide a computer or another programmable data processing terminal device to work in a specific manner, so that the instructions stored in the computer-readable memory generate a product including an instruction apparatus, where the instruction apparatus implements functions specified in one or more processes in the flowcharts and/or in one or more blocks in the block diagrams.

These computer program instructions may also be loaded onto a computer or another programmable data processing terminal device, so that a series of operations and steps are performed on the computer or the another programmable terminal device, thereby generating computer-implemented processing. Therefore, the instructions executed on the computer or the another programmable terminal device provide steps for implementing a specific function in one or more processes in the flowcharts and/or in one or more blocks in the block diagrams.

Other embodiments of this application will be apparent to a person skilled in the art from consideration of the specification and practice of the present disclosure. This application is intended to cover any variations, uses, or adaptive changes of this application. These variations, uses, or adaptive changes follow the general principles of this application and include common general knowledge or common technical means in the art, which are not disclosed in this application. The specification and the embodiments are considered as merely exemplary, and the scope and spirit of this application are pointed out in the following claims.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. It is to be understood that this application is not limited to the precise structures described above and shown in the accompanying drawings, and various modifications and changes can be made without departing from the scope of this application. The scope of this application is limited by the appended claims only.

The foregoing descriptions are merely exemplary embodiments of this application, but are not intended to limit this application. Any modification, equivalent replacement, or improvement made without departing from the spirit and principle of this application shall fall within the protection scope of this application.

The speech processing method and apparatus, and the apparatus for speech processing provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not to be construed as a limitation to this application.

What is claimed is:

1. A speech processing method performed by a terminal device, the terminal device being equipped with n microphones, n being greater than 2, and the method comprising:

performing summation on signals received by the n microphones to obtain a first signal;

performing subtraction on the signals received by the n microphones to obtain a second signal, further comprising:

subtracting a current frame signal received by an $(i-1)^{th}$ microphone from a current frame signal received by an $i^{th}$ microphone to obtain n−1 frame signals, i being in a range of 1 to n;

performing adaptive filtering on the n−1 frame signals and a reference signal y(n) to obtain processed n−1 frame signals, wherein y(n)=yc(n)−N(n), yc(n) is a sum of previous frame signals received by the n microphones, and N(n) is a second frame signal outputted in a previous frame;

performing summation on the processed n−1 frame signals to obtain a second frame signal outputted in a current frame; and processing all frame signals received by the n microphones to obtain the second signal;

performing blind separation on the first signal and the second signal to obtain a speech signal and a noise signal; and performing adaptive noise cancellation on the speech signal based on the noise signal to obtain a target speech signal.

2. The method according to claim 1, further comprising:

performing phase alignment on the signals received by the n microphones before performing summation on the signals.

3. The method according to claim 1, wherein the performing blind separation on the first signal and the second signal to obtain a speech signal and a noise signal comprises:

performing the blind separation on each frame signal in the first signal by using an independent vector analysis blind separation algorithm to obtain the speech signal, and performing the blind separation on each frame signal in the second signal by using the independent vector analysis blind separation algorithm to obtain the noise signal.

4. The method according to claim 1, wherein the method further comprises:

after performing blind separation on the first signal and the second signal to obtain a speech signal and a noise signal:

performing voice activity detection on each frame signal in the speech signal; and setting a voice signal flag bit for a frame signal whose voice activity detection result is a voice signal; and the performing adaptive noise cancellation on the speech signal comprises:

performing the adaptive noise cancellation on a frame signal having a voice signal flag bit in the speech signal.

5. The method according to claim 1, wherein the performing adaptive noise cancellation on the speech signal based on the noise signal to obtain a target speech signal comprises:

using the noise signal as a reference signal and using the speech signal as a target signal, and performing the adaptive noise cancellation on the speech signal based on an adaptive filtering algorithm of a recursive least squares algorithm (RLS) to obtain the target speech signal.

6. A terminal device equipped with n microphones, n being greater than 2, the terminal device comprising one or more processors and a memory storing instructions, the instructions, when executed by the one or more processors, causing the terminal device to perform a speech processing method including:

performing summation on signals received by the n microphones to obtain a first signal;

performing subtraction on the signals received by the n microphones to obtain a second signal, further comprising:

subtracting a current frame signal received by an $(i-1)^{th}$ microphone from a current frame signal received by an $i^{th}$ microphone to obtain n−1 frame signals, i being in a range of 1 to n;

performing adaptive filtering on the n−1 frame signals and a reference signal y(n) to obtain processed n−1 frame signals, wherein y(n)=yc(n)−N(n), yc(n) is a sum of previous frame signals received by the n microphones, and N(n) is a second frame signal outputted in a previous frame;

performing summation on the processed n−1 frame signals to obtain a second frame signal outputted in a current frame; and processing all frame signals received by the n microphones to obtain the second signal;

performing blind separation on the first signal and the second signal to obtain a speech signal and a noise signal; and performing adaptive noise cancellation on the speech signal based on the noise signal to obtain a target speech signal.

7. The terminal device according to claim 6, wherein the method further comprises:

performing phase alignment on the signals received by the n microphones before performing summation on the signals.

8. The terminal device according to claim 6, wherein the performing blind separation on the first signal and the second signal to obtain a speech signal and a noise signal comprises:

performing the blind separation on each frame signal in the first signal by using an independent vector analysis blind separation algorithm to obtain the speech signal, and performing the blind separation on each frame signal in the second signal by using the independent vector analysis blind separation algorithm to obtain the noise signal.

9. The terminal device according to claim 6, wherein the method further comprises:

after performing blind separation on the first signal and the second signal to obtain a speech signal and a noise signal:

performing voice activity detection on each frame signal in the speech signal; and setting a voice signal flag bit for a frame signal whose voice activity detection result is a voice signal; and the performing adaptive noise cancellation on the speech signal comprises:

performing the adaptive noise cancellation on a frame signal having a voice signal flag bit in the speech signal.

10. The terminal device according to claim 6, wherein the performing adaptive noise cancellation on the speech signal based on the noise signal to obtain a target speech signal comprises:

using the noise signal as a reference signal and using the speech signal as a target signal, and performing the adaptive noise cancellation on the speech signal based on an adaptive filtering algorithm of a recursive least squares algorithm (RLS) to obtain the target speech signal.

11. A non-transitory computer-readable storage medium, storing instructions, the instructions, when executed by one or more processors of a terminal device equipped with n microphones, n being greater than 2, causing the terminal device to perform a speech processing method including:

performing summation on signals received by the n microphones to obtain a first signal;

performing subtraction on the signals received by the n microphones to obtain a second signal, further comprising:

subtracting a current frame signal received by an $(i-1)^{th}$ microphone from a current frame signal received by an $i^{th}$ microphone to obtain n−1 frame signals, i being in a range of 1 to n;

performing adaptive filtering on the n−1 frame signals and a reference signal y(n) to obtain processed n−1 frame signals, wherein y(n)=yc(n)−N(n), yc(n) is a sum of previous frame signals received by the n microphones, and N(n) is a second frame signal outputted in a previous frame;

performing summation on the processed n−1 frame signals to obtain a second frame signal outputted in a current frame; and processing all frame signals received by the n microphones to obtain the second signal;

performing blind separation on the first signal and the second signal to obtain a speech signal and a noise signal; and performing adaptive noise cancellation on the speech signal based on the noise signal to obtain a target speech signal.

12. The non-transitory computer-readable storage medium according to claim 11, wherein the method further comprises:

performing phase alignment on the signals received by the n microphones before performing summation on the signals.

13. The non-transitory computer-readable storage medium according to claim 11, wherein the performing blind separation on the first signal and the second signal to obtain a speech signal and a noise signal comprises:

performing the blind separation on each frame signal in the first signal by using an independent vector analysis blind separation algorithm to obtain the speech signal, and performing the blind separation on each frame signal in the second signal by using the independent vector analysis blind separation algorithm to obtain the noise signal.

14. The non-transitory computer-readable storage medium according to claim 11, wherein the method further comprises:

after performing blind separation on the first signal and the second signal to obtain a speech signal and a noise signal:

performing voice activity detection on each frame signal in the speech signal; and setting a voice signal flag bit for a frame signal whose voice activity detection result is a voice signal; and the performing adaptive noise cancellation on the speech signal comprises:

performing the adaptive noise cancellation on a frame signal having a voice signal flag bit in the speech signal.

15. The non-transitory computer-readable storage medium according to claim 11, wherein the performing adaptive noise cancellation on the speech signal based on the noise signal to obtain a target speech signal comprises:

using the noise signal as a reference signal and using the speech signal as a target signal, and performing the adaptive noise cancellation on the speech signal based on an adaptive filtering algorithm of a recursive least squares algorithm (RLS) to obtain the target speech signal.

* * * * *